Oct. 10, 1933.  G. E. GAUS  1,929,843
WIRE BALE TIE
Filed Dec. 16, 1932
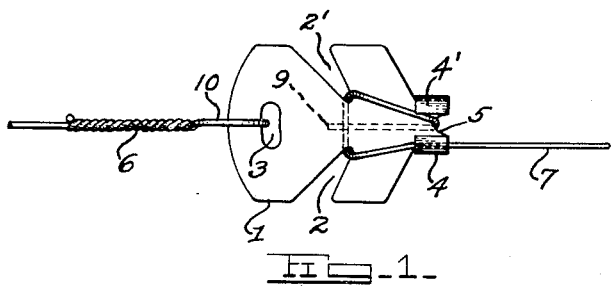
Fig. 1.
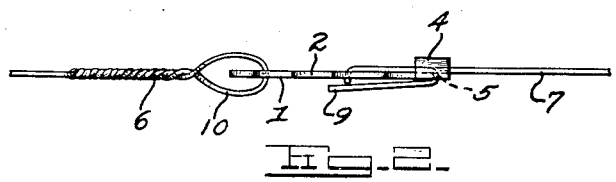 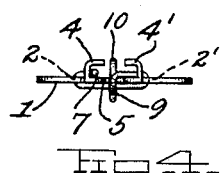
Fig. 2.  Fig. 4.
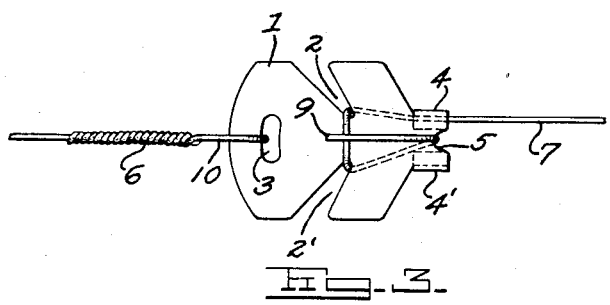
Fig. 3.
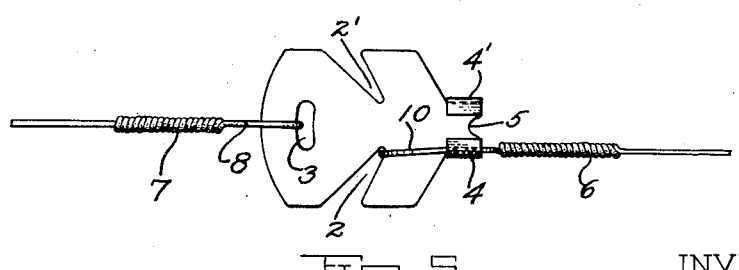
Fig. 5.
INVENTOR
George E. Gaus
By: Ellmenkheim
Attorney.

Patented Oct. 10, 1933

1,929,843

UNITED STATES PATENT OFFICE 1,929,843

WIRE BALE-TIE

George E. Gaus, Washington, D. C., dedicated to the free use of the Government and the People Application December 16, 1932
Serial No. 647,602

2 Claims. (Cl. 24—28)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to that class of ties or bands formed of wire, and has for its primary object to provide a metallic bale-tie or fastener of simple inexpensive construction, permitting the tying of the wire without special tools.

My invention also provides gripping or clamping surfaces, overcoming the tendency of the bale wire ends from separating under strain, or expansive pressure of the baled material.

My invention also provides means for affixing the stationary end of the bale wire.

My invention also provides means for limited lateral motion, thus enhancing its adaptability for use with both fixed and variable length bale wires.

My invention also provides means for covering the free or snag end of the bale wire and retaining it in close contact with the baled material, thus obviating danger of any physical injury resulting from the protruding end of the wire, upon handling the baled material.

In order to carry out the purposes of my invention, reference is to be had to the peculiar combination and arrangement of parts, as shown in the accompanying drawing forming a part of this specification, in which similar numerals refer to similar parts throughout the several views.

Figure I is a front view of my bale-tie or fastener as usually applied in practice, with a bale wire.

Figure II illustrates a side view of my bale-tie or fastener with a bale wire in interlocking position.

Figure III is a back view of my bale-tie or fastener as usually applied in practice, with a bale wire.

Figure IV is an end view of my bale-tie or fastener with a bale wire in interlocking position.

Figure V illustrates my bale-tie or fastener and bale wire in interlocking position using that type of bale wire of fixed length having one end of the bale wire terminating in a loop.

Referring to the drawing, tie-plate 1, of suitable metallic material, represents the body or plate of my fastener, which has formed at one end retainer guides or ears 4 and 4'. V-shaped bottom rounded slot 5 is located midway between retainer guides 4 and 4' and arc-shaped aperture 3 is cut into tie-plate 1, as shown, for attachment of stationary end loop 10 of bale wire 6. Obliquely tapering slots 2 and 2' are cut into each side of tie-plate 1, as shown, said tapering slots 2 and 2' terminate their respective sides tangent to circular openings of a diameter slightly less than that of bale wire 6. These circular openings materially reduce likelihood of cutting the bale wire at the apex of tapering slots 2 and 2'. The transverse distance between the ends of arc-shaped aperture 3 is equivalent to the transverse distance between the circular termini of obliquely tapering slots 2 and 2'. The transverse distance between the sides of retainer guides 4 and 4' should be slightly less than the transverse distance between the circular termini of obliquely tapering slots 2 and 2'.

To use the device covered by my invention, bale wire 6, having end loop 10 connected with tie-plate 1 by means of arc-shape aperture 3, is passed around the girth of the bale in the conventional manner. The loose end 7 of bale wire 6 (Figures I, II, and III) is locked in place by passing it through retainer guide 4 over the front of tie-plate 1 and through obliquely tapering slot 2. It is bent at a right angle to itself, passed behind tie-plate 1 and brought through obliquely tapering slot 2'. It is then bent downwardly over the front of tie-plate 1 and brought through retainer guide 4' and centered over the apex of V-shape bottom rounded slot 5. It is then bent backwardly and in close contact with the underside of the tie-plate 1, thereby, locking and holding bale wire 6. Tie-plate 1 thereby forms a cover for free or snag end 9 and it is held in close contact with the surface of the bale.

From the foregoing, there is taught that a secure fastening for bale wire 6 is formed when it is brought in intimate contact with the gripping action of the unique features of obliquely tapering slots 2, 2' and 5, together with the retentive force exerted by its relation with retainer guides 4 and 4'.

The purpose of having the transverse distance between the ends of arc-shape aperture 3 equivalent to the transverse distance between the circular termini of obliquely tapering slots 2 and 2' is to provide limited lateral motion of my device, and at the same time enhancing its adaptability for use with both fixed and adjustable length type of bale wires. It also directs the proper relation of the ends of the bale wire to each other when subjected to the expansion of the baled material. This latter function is enhanced by guides 4 and 4'.

Figure V illustrates another use to which my invention may be employed in conjunction with that class of bale wire of fixed length, having at one end a manufactured loop 10. In practice, loose end 7 of bale wire 6 is attached to tie-plate 1 at arc-shape aperture 3 by forming loop 8 in bale wire 6. Bale wire 6 is then passed around the girth of the bale in the conventional manner and bale wire 6 is again secured to tie-plate 1 by means of loop 10 by engaging it in obliquely tapering slot 2 or 2' and retainer guide 4 or 4'.

Having thus described my invention, I claim as new and desire to secure by Letters Patent:

1. In a bale-tie, the combination with a flexible wire for encircling the bale, of a plate comprising four openings, one opening being arc-shaped at one end of the plate to receive permanently one end of the wire, obliquely tapering bottom rounded slots at the midsection of the plate and extending from the open ends towards the opposite end of the plate from that in which the arc-shaped opening is formed, retainer guides at the opposite end of the plate from said arc-shaped opening, and a V-shaped bottom rounded slot located midway between said retainer guides.

2. In a bale-tie, a plate, having an arc-shaped aperture at one end, obliquely tapering slots of equal width and length, cut into the edges of said plate and having rounded apexes, the sides of said slots approaching each other to a distance less than the diameter of the binding wire, retainer guides, at the opposite end of the plate from that in which the arc-shaped aperture is located, and a V-shaped bottom rounded slot located midway between said retainer guides, at the opposite end of the plate from that in which the arc-shaped aperture is located, said slots and guides acting in combination to hold and lock the binding wire, without exposing its free end.

GEORGE E. GAUS.